United States Patent
Simon et al.

(10) Patent No.: US 7,669,929 B2
(45) Date of Patent: Mar. 2, 2010

(54) MOTOR VEHICLE SEAT WITH SEAT DEPTH ADJUSTMENT

(75) Inventors: Frank Simon, Erkrath (DE); Nils Magnus, Remscheid (DE); Waldemar Luft, Solingen (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 0 days.

(21) Appl. No.: 12/185,992

(22) Filed: Aug. 5, 2008

(65) Prior Publication Data

US 2009/0039690 A1 Feb. 12, 2009

(30) Foreign Application Priority Data

Aug. 9, 2007 (DE) .................. 10 2007 037 713

(51) Int. Cl.
*A47C 3/00* (2006.01)
(52) U.S. Cl. ................................. 297/284.11
(58) Field of Classification Search ............. 297/361.1, 297/284.11, 284.3, 362.11, 330
See application file for complete search history.

(56) References Cited

U.S. PATENT DOCUMENTS

| 4,636,002 A | * | 1/1987 | Genjiro | ................. 297/319 |
| 5,203,608 A | * | 4/1993 | Tame | ................. 297/320 |
| 6,428,102 B1 | | 8/2002 | Becker et al. | |
| 6,454,353 B1 | * | 9/2002 | Knaus | ................. 297/284.11 |
| 6,601,918 B2 | | 8/2003 | Mattsson | |

FOREIGN PATENT DOCUMENTS

| DE | 3624398 C2 | 1/1988 |
| DE | 19628381 A1 | 1/1998 |
| DE | 19913503 A1 | 9/2000 |
| DE | 19955296 C1 | 2/2001 |
| DE | 69827303 T2 | 2/2006 |

* cited by examiner

*Primary Examiner*—Milton Nelson, Jr.
(74) *Attorney, Agent, or Firm*—Summa, Additon & Ashe, P.A.

(57) ABSTRACT

An adjustable motor vehicle seat with an underframe (20), a seat carrier (28) carried by the underframe (20), a cushion shell (34), a first longitudinal guide (44) being disposed between the seat carrier (28) and the cushion shell (34), and a first drive being provided for adjusting the cushion shell (34) relative to said seat carrier (28). The seat includes a front transverse beam (65) associated with a front edge (72) of the seat. A second longitudinal guide (64) is interposed between the cushion shell (34) and the transverse beam (65). A second drive is responsible for adjusting the seat carrier (28) relative to the cushion shell (34).

22 Claims, 6 Drawing Sheets

MOTOR VEHICLE SEAT WITH SEAT DEPTH ADJUSTMENT

CROSS-REFERENCE TO PRIORITY APPLICATION

This application hereby claims the benefit of the commonly assigned German Patent Application Serial No. 10 2007 037 713.6 (filed Aug. 9, 2007), which is hereby incorporated by reference in its entirety.

FIELD OF THE INVENTION

The invention relates to an adjustable motor vehicle seat with an underframe, a seat carrier carried by the underframe, and a cushion shell. A first longitudinal guide is disposed between the seat carrier and the cushion shell. A first drive is also provided for adjusting the cushion shell relative to the seat carrier.

BACKGROUND

Known motor vehicle seats are described in DE 1 962 838 1 A1. Known vehicle seats with adjustable seat depth are known from DE 698 27 303 T2 in which a front seat part is adjusted relative to a rear seat part by means of an electric motor. In a vehicle seat described in DE 199 13 503 A1, the seat part also includes a front portion and a rear portion, wherein the front and rear portions can be spaced a different distance apart by means of a device for adjusting the seat depth. A similar vehicle seat is also shown in DE 199 55 296 C1.

In known vehicle seats, the cushion shell forms the front edge of the seat frame when viewed in the x direction (i.e., from the perspective of a user facing the seat). In other words, the cushion shell defines the front edge of the seat. In addition to seat depth adjustment, it is also desirable to provide height adjustment of the front edge of the seat (i.e., reclining adjustment).

A known problem with vehicle seats providing seat depth adjustment is that the seat padding body (or padding) must follow the adjustment. Stated differently, the padding must conform to the change in length of the seat to avoid stretching and bunching. It is desirable that the padding substantially retain its quality independent of the seat depth adjustment. Still further, it is desirable to minimize the number of pleats and gaps in the padding, regardless of whether the pleats and gaps are covered or uncovered.

SUMMARY OF THE INVENTION

In view of the motor vehicle seats of the type mentioned herein above, the object of the present invention is to further develop the prior art motor vehicle seat in such a manner that the seat portion is capable of extending and retracting such that the seat portion varies proportionally in size. It is another object of the invention to reduce the amount, and hence cost, of the padding required for the seat portion. This object is achieved by the features of claim 1.

Two relative movements occur on the frame of the inventive motor vehicle seat when the seat depth is adjusted. In a first movement when the seat depth is increased, the cushion shell moves forward relative to the seat carrier i.e., substantially in the x direction. In a second movement when the seat depth is increased, the transverse beam moves forward relative to the cushion shell. The transverse beam also moves substantially in the x direction. The two movements are preferably synchronized. Preferably, the two movements are driven by only one drive motor (e.g., an electric motor or a hand operated gear).

The change in the seat depth is thus achieved by two movements. In contrast to known seats, more than one part of the present seat portion travels forward or backward with respect to the seat carrier, wherein the movement of two parts covers the entire adjustment distance of the seat depth adjustment. Specifically, the entire adjustment distance is divided into (a) the adjustment distance of the cushion shell relative to the seat carrier at a rearward portion of the cushion shell and transverse beam assembly, and (b) the adjustment distance of the transverse beam relative to the cushion shell at a forward portion of the cushion shell and transverse beam assembly. Accordingly, the formula applies wherein the two discrete adjustment distances form together the entire adjustment distance of the seat depth adjustment. The proportioning of the two discrete adjustment distances is thereby arbitrary; it can be 50:50, but it can also vary in the range from 10:90 to 90:10.

The adjustment of the invention can also be referred to as telescopic. Advantageously, a user achieves a proportional change in the seat depth. In particular, the inventive seat does not rely on the movement of only one part of the seat portion. Rather, multiple parts of the seat portion extend such that the seat portion increases or decreases in size, yet retains its overall form in an improved manner as compared to known seats. The proportional extension (i.e. lengthening) and retraction (i.e., shortening) of the seat size promotes increased comfort and a user-friendly design. Furthermore, the present invention more readily facilitates the lengthening or shortening of the padding because the lengthening or shortening occurs between both the seat carrier and the cushion shell, and between the cushion shell and the transverse beam. Moreover, the inventive design reduces the lateral gap between the transverse beam and the cushion shell as compared to known seat designs.

In one embodiment, the direction of the two adjustments (i.e., cushion shell and front transverse beam) may be parallel or non-parallel. For example, the direction of the two adjustments may be rectilinear or curved. In this fashion, one has multiple parameters from which to choose to best adapt the seat portion to passengers of different body size.

Referring to FIG. 2, the two adjustment directions lie in the x-z plane. This plane is preferably arranged at an angle of 45° relative to the x axis. Advantageously, the increase or reduction of the seat depth thereby occurs parallel to the direction of lengthwise (i.e., longitudinal) adjustment of a corresponding arrangement for longitudinally adjusting the position of the entire motor vehicle seat carrier as it is known in the art. Stated differently, the movement of the cushion shell and transverse beam to adjust seat depth is parallel to the movement of the seat carrier to adjust the distance of the seat carrier to the steering wheel.

In one embodiment, the seat depth adjustment can be favourably combined with a reclining adjustment. Thereby, the incline of the cushion shell with respect to the seat carrier is preferably changed. The angle between the transverse beam and the cushion shell is not affected thereby. It is however also possible to adjust the angle between the transverse beam and the cushion shell, together with or without the angle between the cushion shell and the seat carrier.

An advantage of the invention is that the motor vehicle seat of the invention can be most readily implemented in a reduced or economy version. In this case, seat depth adjustment is limited to movement of the cushion shell relative to the seat carrier and forgoes the use of a transverse beam separate from the cushion shell, a second longitudinal guide and a second drive. The adjustment distance is then only a portion of the entire adjustment distance for a seat depth adjustment, and only 10% to 90% of the entire adjustment distance (e.g., only 50% thereof). This economical embodiment is however also much more simple, lighter, and cheaper than the embodiment providing two movements for seat depth adjustment.

Multiple arrangements are possible for ensuring the coupled actuation of the two longitudinal guides. In one embodiment, a single drive motor (e.g., an electric motor) is provided, wherein the motor performs both adjusting movements. In this embodiment including a motor, the adjusting movements may be activated by a spindle drive with a spindle, wherein for example, the spindle includes two different threaded regions of different pitch. In other embodiments, the adjusting movements may be activated by a lever gear (e.g., Nuremberg scissors) or a block and tackle.

The foregoing and other objects and advantages of the invention and the manner in which the same are accomplished will become clearer based on the following detailed description taken in conjunction with the accompanying drawings.

DETAILED DESCRIPTION

Herein after, the first exemplary embodiment shown in the FIGS. 1 through 4 will be discussed, followed by the second and third exemplary embodiment, but only insofar as the second and third exemplary embodiments differ from the first exemplary embodiment.

Figure 1:
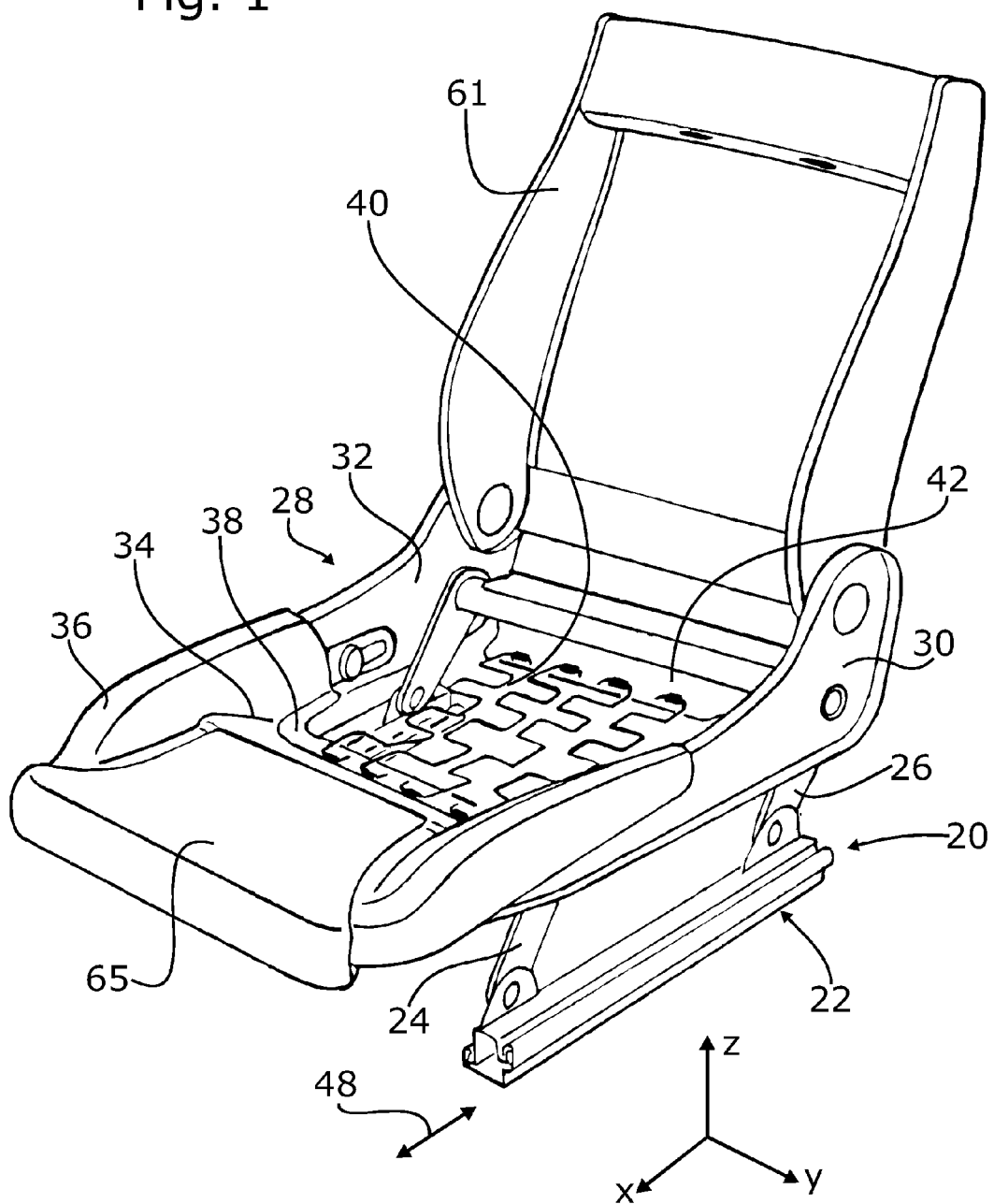
FIG. 1 is a perspective view of a motor vehicle seat of the present invention.

Referring to FIG. 1, the adjustable vehicle seat includes a conventional underframe 20 and a longitudinal adjustment device 22 with two pairs of rails that are configured in a conventional manner. The two pairs of rails carry front rocker arms 24 and rear rocker arms 26. The rocker arms 24, 26 carry a seat carrier 28 that is substantially formed by a left side part 30 and a right side part 32. The rockers arms 24, 26 are articulated to the top of the left and right side parts 30, 32 in any conventional manner.

Figure 4:
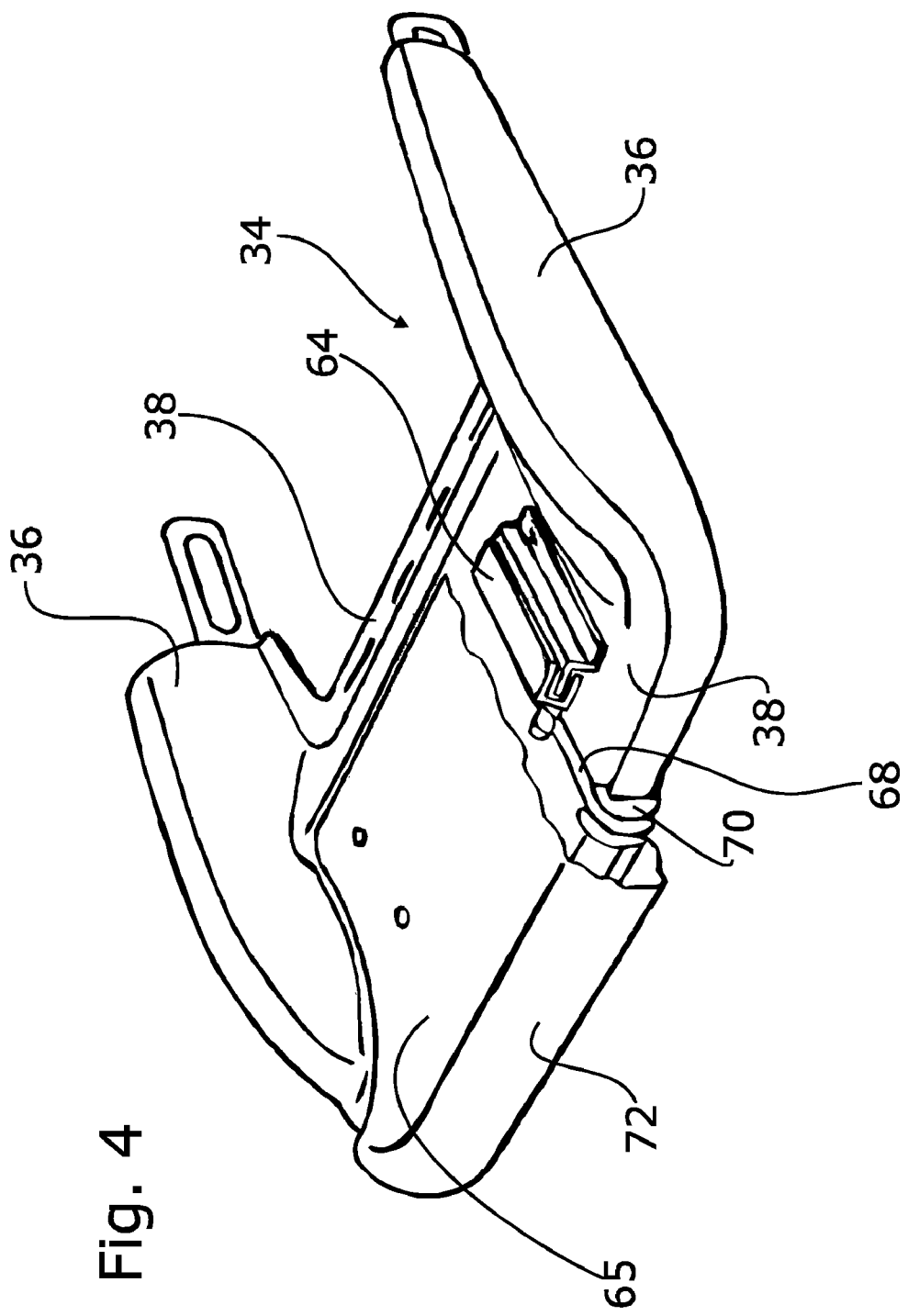
FIG. 4 is a partial perspective view of a cushion shell of the seat depicting a transverse beam, a second longitudinal guide, and parts of a drive associated with the second longitudinal guide.

As depicted in FIGS. 1 and 4, the vehicle seat further provides a cushion shell 34 which occupies approximately 40 to 70% of the seat depth and forms lateral cheeks 36 that overlap the left and right side parts 30, 32. The cushion shell 34 defines a front transverse region 38 to which springs of a cushioning 40 are attached to the rearward portion thereof. At opposite ends, the springs are retained on a skirt 42 of the seat carrier 28. The skirt 42 connects the left and right side parts 30, 32 of the seat carrier at a rear portion thereof.

Between the seat carrier 28 and the cushion shell 34 there is formed a first longitudinal guide 44. The first longitudinal guide 44 adjustably connects the cushion shell 34 to the seat carrier 28. In the embodiment shown, the first longitudinal guide 44 is a rail guide. In this exemplary embodiment shown depicted in FIG. 1, this first longitudinal guide 44 is configured in a similar fashion as one of the two pairs of rails of the longitudinal adjustment device 22. The first longitudinal guide 44 may, however, be a slide block guided in a long hole, a lever gear (e.g., having a curved path of travel formed by a pivoting arm), Nuremberg scissors, a wobbling gear, or any other device providing a similar function. The first longitudinal guide 44 has a first direction of adjustment 46 that extends in the x-z plane and has an angle of about 30°. This angle, however, also depends on the reclining adjustment relative to the x axis as discussed herein. In the configuration shown, the first direction of adjustment 46 is linear, but it can also be in the form of a curved path. The direction of adjustment 46 extends substantially parallel to a direction of lengthwise adjustment 48 of the vehicle seat by way of the longitudinal adjustment device 22.

The first longitudinal guide 44 is connected to an intermediate part 50 that is articulated to the side part 30 through an adjustment arm 52. The intermediate part 50 and the adjustment arm 52 also form a part of the seat carrier 28. Accordingly, the first longitudinal guide 44 is not directly connected to the side part 30, except in the case of the embodiment depicted in FIG. 5. A reclining adjustment is achieved by lowering and raising the intermediate part 50.

The cushion shell 34 is articulated and retained for longitudinal displacement in a rear guide 54 on each side part 30, 34. The cushion shell is guided substantially parallel to the direction of longitudinal adjustment 48. For this purpose, tongues of the cushion shell 34, which are pointed backward, include long holes (see FIG. 4). Journals extend through these long holes, wherein each side part 30, 32 defines a journal.

A drive for the reclining adjustment is not shown in the figures. It will be understood that a prior art drive can be utilized, for example in accordance with DE 36 24 398 C2. The reclining adjustment is defined by the angular range 56 shown in a dash-dot line in the figures. The apex of the angular range 56 is positioned at the rear hinge point of the adjustment arm 52.

In one embodiment, a one-piece abutment 58 is provided on the cushion shell 34. The abutment 58 projects downward in proximity to the rear part of the cushion shell 34. A spindle drive 60 is articulated and disposed on either side of the cushion shell between the abutment 58 and the front hinge point of the adjustment arm 52. The function of the spindle drive is explained herein below.

The angular position of the adjustment arm 52 is fixed by the drive for the reclining adjustment (not depicted). If the spindle drive 60 is actuated (i.e., when the electric motor 62 is supplied with voltage), the distance between the abutment 58 and the front hinge point of the adjustment arm 52 as well as the intermediate part 50, changes. Depending on the direction of rotation, the cushion shell 34 is moved backward or forward in the first direction of adjustment 46. The two end points of this movement are shown in the FIGS. 2 and 3.

A second longitudinal guide 64 is provided and disposed between the cushion shell 34 and a front transverse beam 65. In one embodiment, the second longitudinal guide 64 may be a rail guide. The second longitudinal guide 64 adjustably connects the front transverse beam 65 to the cushion shell 34. The explanations given above with respect to the first longitudinal guide 44 also apply for this second longitudinal guide 64. The second longitudinal guide 64 facilitates movement of a front transverse beam 65 relative to the cushion shell 34. The direction of movement of the front transverse beam follows a second direction of adjustment 66. In the embodiment shown, the two directions of adjustment 46, 66 are parallel to each other. It will be understood, however that the two directions of adjustment 46, 66 may be inclined at an angle ranging from 5° to 30° relative to each other. In the embodiment shown, the adjustment distance of the second longitudinal guide 64 is double or twice the adjustment distance of the first longitudinal guide 44. It will be understood, however, that this ratio is not mandatory and the ratio can also range between 4:1 and 1:4.

Figure 2:
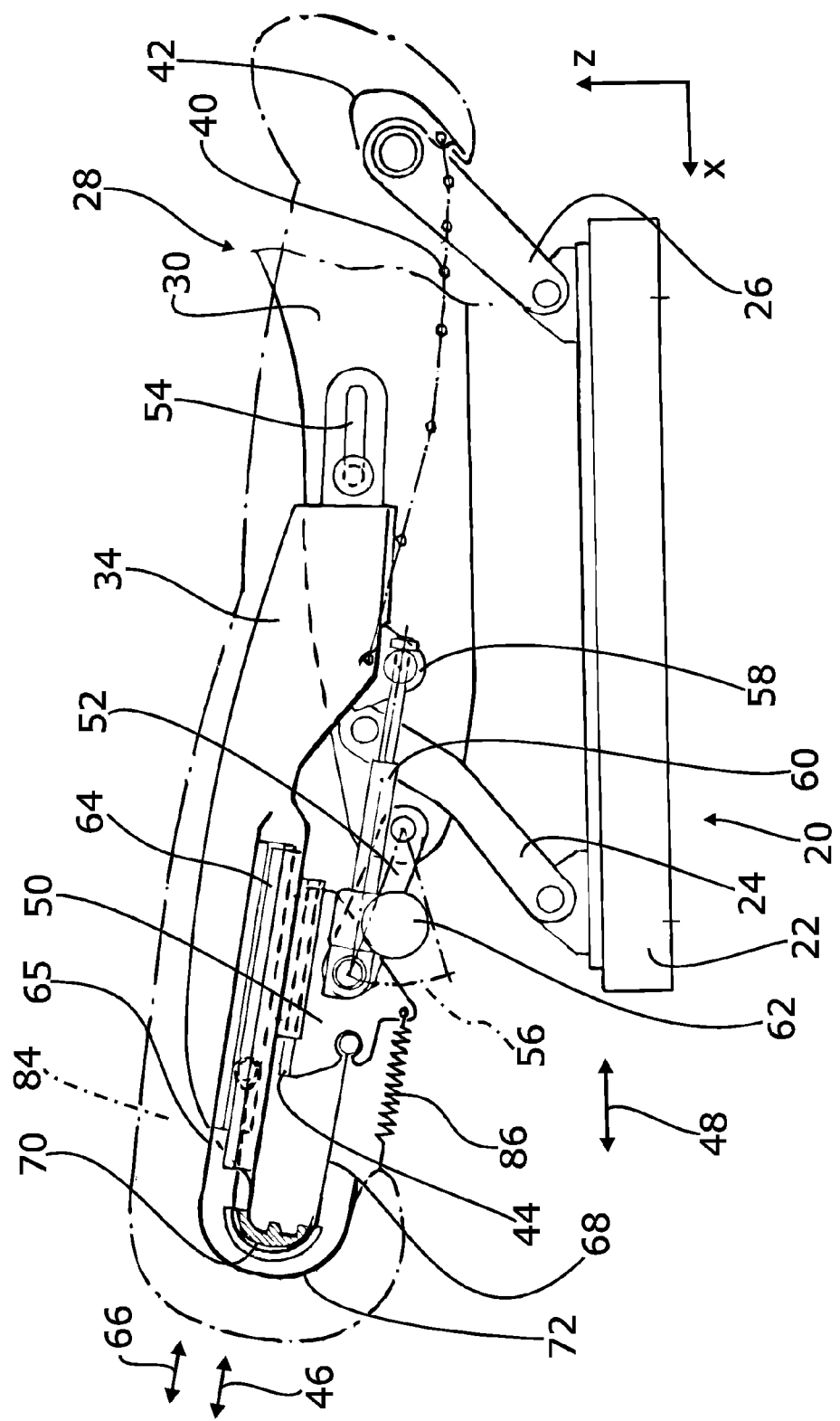
FIG. 2 is a partial cross-sectional side view of a frame of one embodiment of the motor vehicle seat shown in FIG. 1 wherein the seat is in a completely forward depth-adjusted position.
Figure 3:
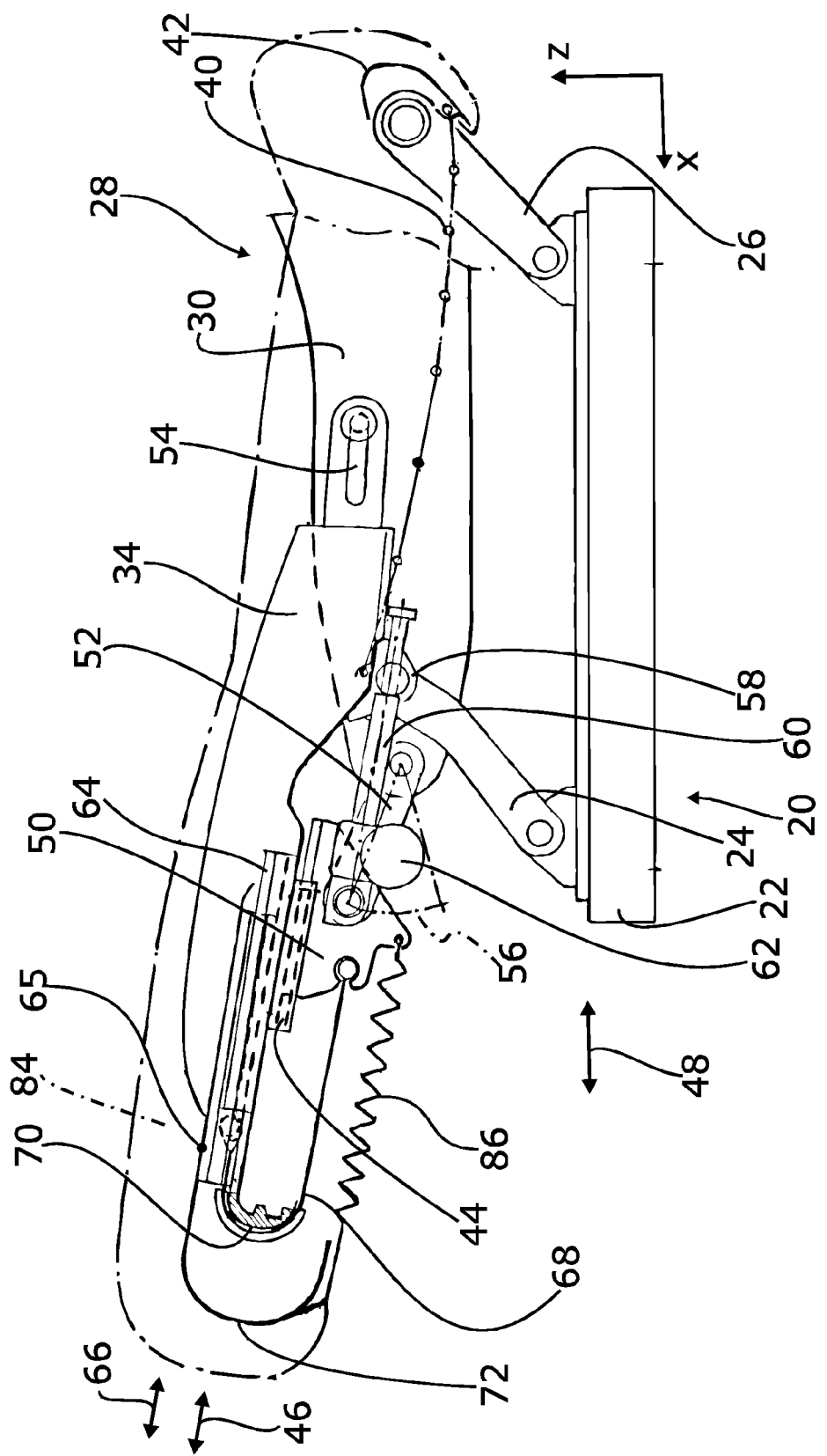
FIG. 3 is a partial cross-sectional side view of the seat frame of FIG. 1, wherein the seat is in a completely backward depth-adjusted position.

As shown in FIGS. 2 and 4 the second longitudinal guide 64 is driven by the spindle drive 60, too. One of the two rails of the second longitudinal guide 64 is connected to the front transverse beam 65. This rail is the upper rail in the figures. This rail is attached to one end of a strap 68. The strap 68 is guided about a front deflection 70 which is connected with the cushion shell 34. At its other end, the strap 68 is fixed to the intermediate part 50. As a result, a kind of block and tackle is formed. If, starting from the position shown in FIG. 2, the spindle drive 60 is retracted viz. shortened to the position shown in FIG. 3, the cushion shell 34, and as a result thereof the front deflection 70, travels backward for a distance that substantially corresponds (depending on the angle of the reclining adjustment) to the distance travelled by the spindle drive 60. As a result of the movement, a length of the strap 68 corresponding to the adjustment distance is pulled at the top and at the bottom of the strap 68 so that the strap generally is pulled over a distance corresponding to twice the adjustment distance of the spindle drive 60. The top rail of the second longitudinal guide 64 can move this double adjustment distance with respect to the bottom rail. A suited spring (not shown) is e.g., provided for moving the top rail relative to the bottom rail in the reverse direction. Generally, the second longitudinal guide 64 moves two times or twice the adjustment distance, while the first longitudinal guide 44 moves one times or once the adjustment distance. The first and second longitudinal guides 44, 64 move in the same direction.

FIG. 4 clearly shows the configuration of the cushion shell 34 and of the front transverse beam 65. The front transverse beam 65 is a steel sheet blank that is curved into a U-shape in the region of a front edge 72. The lateral end regions of the front transverse beam 65 are rounded. As a result, the structure is formed for the front edge of the seat. The front transverse beam 65 is also referred to as a carrier sheet steel.

Figure 5:
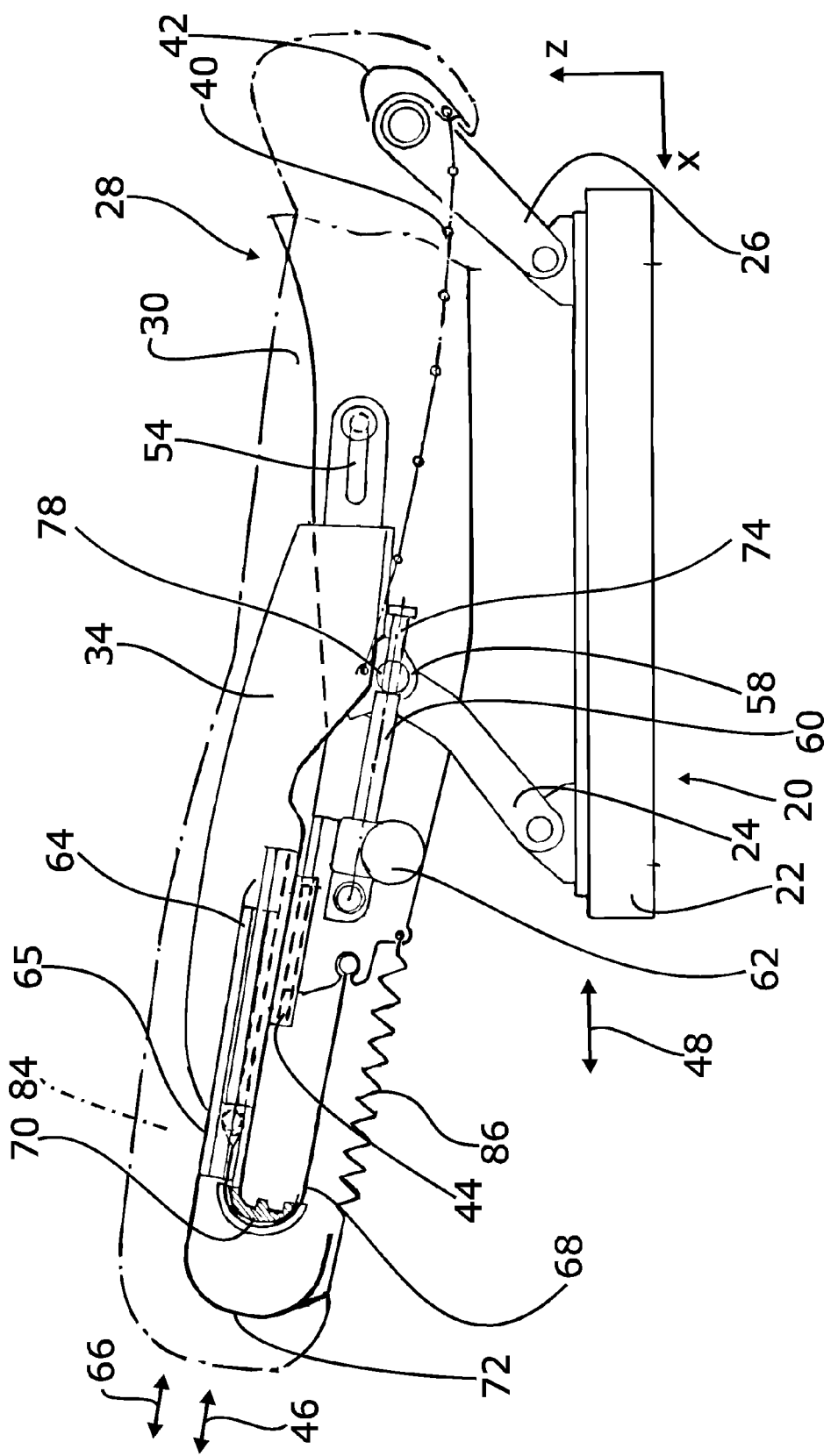
FIG. 5 is a partial cross-sectional side view of another embodiment of the seat frame wherein the seat frame lacks a mechanism for adjusting the recline of the seat.

In the embodiment shown in FIG. 5, a reclining adjustment is not provided. The intermediate part 50 is now integral with at least one of the side parts 30, 32. In this embodiment, the adjustment arm 52 has been eliminated. The movement sequences for the seat depth adjustment in the embodiment of FIG. 5 are the same as in the first exemplary embodiment.

Figure 6:
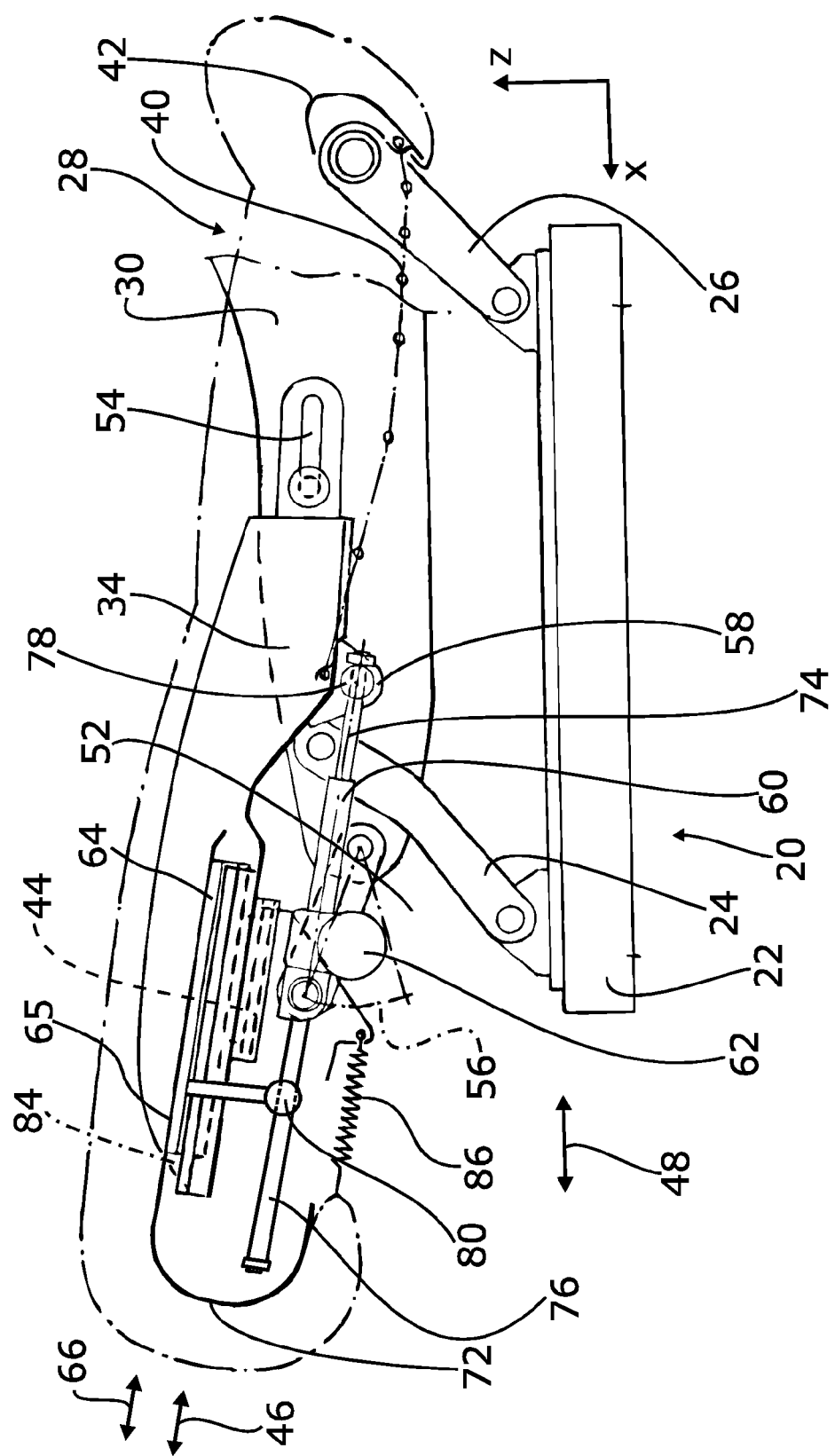
FIG. 6 is a partial cross-sectional side view of yet another embodiment of the seat frame, wherein the drive of the second longitudinal guide is reconfigured.

In the third exemplary embodiment shown in FIG. 6, the second longitudinal guide 64 is not driven by a strap 68. Specifically, this embodiment lacks a strap and a front deflection 70. In this embodiment, the spindle of the spindle drive 60 includes a first threaded region 74 and a second threaded region 76. The two threaded regions 74, 76 have a different pitch. The pitch of the second threaded region 76 is larger than the pitch of the first threaded region 74. For example, the pitch of the second threaded region 76 may be 1.2 to 3 times the pitch of the first threaded region 74. The first threaded region 74 extends through a first spindle nut 78 arranged on the abutment 58. Accordingly, a first drive is thus formed.

The second threaded region 76, absent from the first embodiment, extends through a second spindle nut 80. This second spindle nut 80 is associated with the top rail of the second longitudinal guide 64 and is connected therewith. In this way, a second drive is formed.

Upon actuation of the spindle drive 60, the second spindle nut 80 moves towards or away from the motor 62 at a higher speed than the first spindle nut 78 as a result of the variance in pitch. As configured, the bottom rail of the second longitudinal guide 64 is moved at the speed of the first spindle nut 78, and the top rail of the second longitudinal guide is moved at the higher speed of the second spindle nut 80.

In an alternative to the embodiment depicted in FIG. 6, it is also possible to provide a pinion on the electric motor 62. In this alternative embodiment, gearing on the pinion engages a toothed rack that is associated with the top rail of the second longitudinal guide 64. It is also possible to connect the top rail of the second longitudinal guide 64 to the electric motor 62 through a pivoted lever.

A padding 84 rests on and covers at least a portion of the transverse beam 65, the cushion shell 34 and the cushioning 40. The padding is pulled about and over the front edge 72. The lower end of the padding 84 is kept in a state of tension by means of a spring 86 interposed between the lower end of the padding and the intermediate part 50. As evident when comparing FIGS. 2 and 3, the padding can be displaced (i.e., slides over and wraps around the front edge 72 of the seat). The motor vehicle seat also includes a back rest 61 that is carried by the seat carrier 28.

In the embodiment shown, the electric motor 62 of the spindle drive 60 is associated with the seat carrier 28, and the first spindle nut 78 is associated with the cushion shell 34. The spindle drive can also be disposed in reverse, meaning that the electric motor moves together with the cushion shell 34.

The invention claimed is:

1. An adjustable motor vehicle seat comprising:
an underframe (20);
a seat carrier (28) carried by said underframe (20);
a cushion shell (34);
a front transverse beam (65) associated with a front edge (72) of the seat;
a first longitudinal guide (44) disposed between said seat carrier (28) and said cushion shell (34);
a second longitudinal guide (64) interposed between said cushion shell (34) and said transverse beam (65);
a first drive provided for adjusting said cushion shell (34) relative to said seat carrier (28), and
a second drive that is responsible for adjusting said front transverse beam relative to said cushion shell (34).

2. The motor vehicle seat as set forth in claim 1, wherein:
said first drive and said second drive are coupled together such that, when said cushion shell (34) is being adjusted relative to said seat carrier (28), said transverse beam (65) is also adjusted relative to said cushion shell (34); and
the directions of adjustment (46) of said cushion shell relative to said seat carrier, and said transverse beam relative to said cushion shell being substantially the same.

3. The motor vehicle seat as set forth in claim 1, wherein one common motor (62) is associated with said first drive and said second drive.

4. The motor vehicle seat as set forth in claim 1, wherein:
said first longitudinal guide (44) has a first direction of adjustment (46), said first direction of adjustment (46) lying in an x-z plane;
said second longitudinal guide (64) has a second direction of adjustment (66), said second direction of adjustment (66) lying in the x-z plane; and
said first direction of adjustment (46) and said second direction of adjustment (66) inclined at an angle ranging between about 5° and 40° to the x axis.

5. The motor vehicle seat as set forth in claim 1, further comprising a cushioning (40) interposed between said seat carrier (28) and said cushion shell (34).

6. The motor vehicle seat as set forth in claim 1, wherein said seat carrier (28) comprises two seat side parts, at least one intermediate part (50) and at least one adjustment arm (52).

7. The motor vehicle seat as set forth in claim 1, wherein:
said second longitudinal guide (64) is connected to said front transverse beam (65);
said second longitudinal guide (64) having a rail connected to one end of a strap (68) of the second drive, said strap (68) laid about a front deflection (70) of said cushion shell (34), said strap (68) connected at another end to said seat carrier (28).

8. The motor vehicle seat as set forth in claim 1, further comprising a spindle drive (60) having a spindle with two different threaded regions (74, 76) and two spindle nuts (78, 80).

9. The motor vehicle seat as set forth in claim 1, further comprising a device for reclining adjustment interposed between said cushion shell (34) and said seat carrier (28);
wherein said cushion shell (34) is articulated to said seat carrier (28).

10. The motor vehicle seat as set forth in claim 1, wherein:
said first longitudinal guide (44) has a first adjustment path; and
said second longitudinal guide (64) has a second adjustment path, said second adjustment path is 1.2 to 3 times the length of said first adjustment path.

11. The motor vehicle seat as set forth in claim 1, further comprising a spindle drive (60) having a spindle with at least one threaded region (74) and at least one spindle nut (78).

12. An adjustable motor vehicle seat comprising:
an underframe (20) for securing the seat in a vehicle;
a seat carrier (28) supported by said underframe (20);
a cushion shell (34) adjustably connected to at least a portion of said seat carrier;
a front transverse beam (65) adjustably connected to at least a portion of said cushion shell (34), said front transverse beam defining a front edge (72) of the seat;
a first longitudinal guide (44) secured to at least a portion of said seat carrier (28), said first longitudinal guide adjustably connecting said cushion shell (34) to said seat carrier (28); and
a second longitudinal guide (64) secured to at least a portion of said front transverse beam (65), said second longitudinal guide adjustably connecting said front transverse beam (65) to said cushion shell (34);
a first drive for adjusting the position of said cushion shell (34) relative to said seat carrier (28); and
a second drive for adjusting the position of said front transverse beam (65) relative to said cushion shell (34).

13. The motor vehicle seat as set forth in claim 12, wherein:
said first drive and said second drive are operatively connected such that an adjustment of said cushion shell (34) relative to said seat carrier (28), and an adjustment of said transverse beam (65) relative to said cushion shell (34), occur substantially at the same time; and
a direction of adjustment of said cushion shell (34) relative to said seat carrier (28), and a direction of adjustment of said transverse beam (65) relative to said cushion shell (34), are substantially similar.

14. The motor vehicle seat as set forth in claim 12, wherein:
said first longitudinal guide (44) provides a first direction of adjustment (46) of said cushion shell (34) relative to said seat carrier (28); and
said second longitudinal guide (64) provides a second direction of adjustment (66) of said front transverse beam (65) relative to said cushion shell (34), said first and second directions of adjustment substantially coplanar with respect to one another.

15. The motor vehicle seat as set forth in claim 14, wherein said first direction of adjustment (46) and said second direction of adjustment (66) are inclined at an angle ranging between about 5° and 40° relative to an x axis.

16. The motor vehicle seat as set forth in claim 12, further comprising:
a front deflection (70) secured to a forward edge of said cushion shell (34);
a strap (68) of the second drive connected at one end to said seat carrier (28) and connected at another end to said second longitudinal guide (64), said strap under tension;
wherein said strap extends from said seat carrier (28), across said front deflection (70) of said cushion shell, and to said second longitudinal guide (64) on said front transverse beam (65) such that movement of said seat carrier (28) promotes movement of said front transverse beam (65).

17. The motor vehicle seat as set forth in claim 12, wherein:
said first longitudinal guide (44) provides a first adjustment path; and
said second longitudinal guide (64) provides a second adjustment path, said second adjustment path is between about 1.2 to 3 times the length of said first adjustment path.

18. The motor vehicle seat as set forth in claim 12, further comprising a motor (62) for driving said first and second drives.

19. The motor vehicle seat as set forth in claim 12, further comprising a spindle drive (60) having a spindle with two different threaded regions (74, 76) and two spindle nuts (78, 80).

20. The motor vehicle seat as set forth in claim 12, further comprising a device for reclining adjustment interposed between said cushion shell (34) and said seat carrier (28);
wherein said cushion shell (34) is articulated to said seat carrier (28).

21. The motor vehicle seat as set forth in claim 12, further comprising a spindle drive (60) having a spindle with at least one threaded region (74) and at least one spindle nut (78).

22. An adjustable motor vehicle seat comprising:
an underframe (20) for securing the seat in a vehicle;
a seat carrier (28) supported by said underframe (20);
a cushion shell (34) adjustably connected to at least a portion of said seat carrier;
a front transverse beam (65) adjustably connected to at least a portion of said cushion shell (34);
a first longitudinal guide (44) secured to at least a portion of said seat carrier (28), said first longitudinal guide adjustably connecting said cushion shell (34) to said seat carrier (28); and
a second longitudinal guide (64) secured to at least a portion of said front transverse beam (65), said second longitudinal guide adjustably connecting said front transverse beam (65) to said cushion shell (34);
wherein said cushion shell (34) and said front transverse beam (65) are operatively connected such that an adjustment of said cushion shell (34) relative to said seat carrier (28) promotes an adjustment of said transverse beam (65) relative to said cushion shell (34).

* * * * *